2,791,568

NON-YELLOWING BAKING FINISH

Sydney H. Shapiro, Chicago, and Anna K. Susina, Berwyn, Ill., assignors to Armour and Company, Chicago, Ill., a corporation of Illinois No Drawing. Application February 2, 1952, Serial No. 269,693

2 Claims. (Cl. 260—21)

The present invention relates generally, to new and improved modified alkyds and to new and improved melamine-formaldehyde and urea-formaldehyde baking finishes plasticized therewith.

Lauric acid modified alkyds have been widely used as plasticizers for non-yellowing melamine-formaldehyde and urea-formaldehyde baking finishes. It has been found according to this invention that such baking finishes may be materially improved and the cost thereof reduced by formulating therewith lauric acid modified alkyds wherein a substantial proportion of the lauric acid content is replaced by resin acids stabilized against oxidation. The addition of adipic acid along with the stabilized resin acids further enhances the improvements in properties which are obtained.

Resin acids, or rosin acids as they are also called, are acid substances composed essentially of di-terpene acids of the formula $C_{19}H_{29}COOH$ as represented by abietic acid, levopimaric acid and sapinic acid. The term "resin acids" as used herein and in the appended claims is intended to designate such acid substances. Abietic acid is the principal constituent and the other acids present in resin acids may be considered isomers of abietic acid. The resin acids occur in the exudate of pine trees and also in tall oil and they are obtained from these sources commercially. It will be noted from their general formula that the resin acids are unsaturated and because of the conjugated double bond which they contain they are highly susceptible to atmospheric oxidation. When the unstable resin acids are heated in known manner, preferably with catalytic amounts of palladium, nickel, iodine, or other known catalyst, disproportionation and dehydrogenation take place, destroying the oxygen-sensitive double-bond system. The primary product of these reactions is dehydroabietic acid and the stabilized resin acids may be considered as disproportionated and dehydrogenated abietic acid, or as stabilized abietic acid for simplicity. This product may also be referred to as disproportionated rosin. The stabilized abietic acid or disproportionated rosin contains a benzenoid structure which is extremely resistant to oxidation. One satisfactory method of stabilizing resin acids against oxidation involves heating them to a temperature of 100°–240° C., but always below the temperature of where there is substantial destructive distillation, in the presence of elemental iodine in an amount equal to 0.2%–5.0% by weight based on the content of abietic type resin acid for such a period of time as is required to reduce the abietic acid content to below 10% of the original.

While the preferred embodiments of the invention are obtained with lauric acid modified alkyds, the invention is broader in scope and significant benefits are also obtained with other mono-basic fatty acid modified alkyds wherein the number of carbon atoms in the fatty acids range from 8 to 18. The preferred range is from 10 to 14 carbon atoms and the 12 carbon atom fatty acid (i. e. lauric acid) is the best.

Accordingly, the object of the invention generally stated, is the provision of new and improved modified alkyds and melamine-formaldehyde and urea-formaldehyde baking finishes plasticized therewith wherein the alkyds are modified with lauric acid or a fatty acid containing from 8 to 18 carbon atoms but with a substantial proportion of the normal lauric acid or such other fatty acid content being replaced by resin acids as represented by abietic acid stabilized against oxidation, and preferably with a substantial proportion of adipic acid being included.

Certain other objects of the invention will, in part be obvious and will in part appear hereinafter.

For a more complete understanding of the nature and scope of the invention reference may now be had to the following detailed description thereof wherein certain specific embodiments of the invention are set forth by way of example and others are referred to.

Alkyds are resinous esters and the general method of preparation involves heating together phthalic anhydride and glycerol together with such modifiers as may be present under such predetermined conditions as have been found to yield the desired products. Thus, a straight lauric acid modified alkyd may be made according to the following example:

Example 1

272 grams of lauric acid and 283 grams of 98% glycerol were placed in a three-necked flask equipped for azeotropic esterification with an agitator, thermometer, condenser, and means for separating the evolved water from solvent. The mixture was heated to 350° F. At this point 445 grams of phthalic anhydride and 138.1 grams of xylol were added. The temperature was raised to 420° F. in 1½ hours and held until an acid value of 6 was obtained. The resin was then reduced to 50% solids with xylol. The viscosity (Gardner-Holdt) was between S and T. This resin contains 36% lauric and 64% phthalic as glycerides.

In the two following examples the apparatus and general procedure of Example 1 are used but the lauric acid is entirely replaced with stabilized resin acids or stabilized abietic acid.

Example 2

In an apparatus similar to that used in Example 1, 676 grams of stabilized resin acids (disproportionated rosin) and 208 grams of 98% glycerol were heated to 350° F. in one hour. When this temperature was attained, 232 grams of phthalic anhydride and 140.3 grams of xylol were added. The temperature was raised to 440° F. in 2 hours. The reaction was held at this temperature until acid value reached 11. When reduced to 50% solids with xylol a Gardner-Holdt viscosity of A was obtained. This alkyd contains 70% stabilized abietic acid as glyceride.

Example 3

580 grams of stabilized abietic acid and 238 grams of 95% glycerol were placed in an apparatus similar to that used in Example 1. The mixture was heated to 350° F. in one hour. At this point 309 grams phthalic anhydride and 140 g. of xylol were added and the temperature raised to 420 in one hour. The reaction was held at this temperature until the acid value was less than 20. The product which was approximately 60% stabilized abietic acid as the glyceride could not be completely dissolved in xylol.

The remaining examples illustrate the presently preferred embodiments of the invention in that only a portion of the lauric acid is replaced with the stabilized resin acids or stabilized abietic acid. Adipic acid is substituted for a portion of the phthalic acid and added therewith in Examples 8–11.

Example 4

189 grams of lauric acid, 193 grams of stabilized abietic acid and 314 grams of 95% glycerol were placed in an apparatus similar to that used in Example 1. The mixture was heated to 350° F. in one hour. At this time 465 grams of phthalic anhydride and 136 grams of xylol were added and the reaction heated to 420° F. in 1½ hours. The reaction was held at this temperature until the acid value was below 20. The alkyd was reduced to 50% solids with xylol and had a Gardner-Holdt viscosity of $Z^+$. The solids had an approximate composition of 20% stabilized abietic and 20% lauric as their glycerides.

Example 5

In an apparatus similar to that used in Example 1 were placed 290 grams of stabilized abietic acid, 94 grams of lauric acid and 307 grams of 95% glycerol. The mixture was heated to 350° F. in one hour at which time 465 grams of phthalic anhydride and 138 grams of xylol were added. The reaction was then heated to 420° F. in 90 minutes and held until an acid value of under 25 was obtained. The product had an approximate composition of 30% stabilized abietic acid and 10% lauric acid as their glycerides.

Example 6

In an apparatus similar to that used in Example 1 were placed 289 grams of stabilized abietic acid, 185 grams of lauric acid and 373 grams of 95% glycerol. The mixture was heated to 350° F. in one hour. At this time 387 grams of phthalic anhydride and 136 grams of xylol were added. The reaction was then heated to 420° F. in one hour and held until the acid value below 3 obtained. The viscosity was A, Gardner-Holdt. The solids had the following approximate percent composition as glycerides: 20% lauric and 30% stabilized abietic.

Example 7

In an apparatus similar to that used in Example 1 were placed 385 grams of stabilized abietic acid, 188.5 grams of lauric acid and 252 grams of 95% glycerol. The reaction was heated to 350° F. in one hour. At this point 309 grams of phthalic anhydride and 137 grams of xylol were added. The reaction mixture was heated to 420° F. in 90 minutes and held there until an acid value below 10 was obtained. The resin was reduced to 50% solids with xylol and a viscosity of A Gardner-Holdt was obtained. The solids had the following approximate composition as glycerides: 40% stabilized abietic and 20% lauric.

Example 8

In an apparatus similar to that used in Example 1 were placed 289 grams of stabilized abietic acid, 95 grams lauric acid and 316.3 grams of 95% glycerol. The mixture was heated to 350° F. in one hour and at that time 309 grams of phthalic anhydride, 171 grams of adipic acid and 135 grams of xylol were added. The reaction was heated to 420° F. in 90 minutes. After 1 hour at that temperature the reaction polymerized to an insoluble mass.

Example 9

In an apparatus similar to that used in Example 1 were placed 289 grams of stabilized abietic acids from tall oil, 189 grams of lauric acid and 288 grams of 95% glycerol. The reaction was heated to 350° F. in one hour. At this time 85.5 grams of adipic acid and 309 grams of phthalic anhydride and 136 grams of xylol were added. The temperature was raised to 420° F. in one hour and held until the acid value below 9 was obtained. The alkyd on being reduced to 50% solids had a viscosity of F, Gardner-Holdt. The solids had the following approximate composition as glycerides: 30% stabilized abietic, 20% lauric, and 10% adipic.

Example 10

In an apparatus similar to that used in Example 1 were placed 385 grams of stabilized abietic acid, 94 grams of lauric acid and 280 grams of 95% glycerol. The mixture was heated to 350° F. in one hour. At this point 309 grams of phthalic anhydride, 86 grams of adipic acid and 136 grams of xylol were added. The temperature was raised to 420° F. in 90 minutes and held until the acid value was under 35. The viscosity was $T^+$ Gardner-Holdt. The solids had the following approximate composition as glycerides: 40% stabilized abietic acid, 10% lauric and 10% adipic.

Example 11

In an apparatus similar to that used in Example 1 were placed 338 grams of stabilized abietic acid, 141 grams of lauric acid and 284 grams of glycerol. The reaction was heated to 350° F. in one hour at which time 309 grams of phthalic anhydride, 85.5 grams of adipic acid and 136 grams of xylol were added. The reaction was heated to 420° F. in one hour. The reaction was held at this temperature until an acid value of less than 12 was reached. The viscosity was V, Gardner-Holdt. The solids had an approximate composition as glycerides as follows: 35% stabilized abietic, 15% lauric, 10% adipic.

The modified alkyds made in accordance with the foregoing examples are evaluated by using them as plasticizers for melamine-formaldehyde and urea-formaldehyde baking finishes and comparing the properties of such baking finishes under controlled conditions with those of reference standards wherein lauric acid modified alkyds are used as plasticizers. The baking finishes made with the modified alkyds of this invention are as good as or superior to the commercial lauric, oleic or other fatty acid modified baking alkyds in respect to color, gloss retention and heat stability. The alkyds of the invention which contain adipic acid give the best all around films. Of the various embodiments tested, the best results were obtained with the modified alkyd made according to Example 9 containing 30% stabilized abietic acid, 20% lauric acid, 10% adipic acid and 40% phthalic anhydride reported as glycerides.

Certain minor modifications may be made in the foregoing examples. For one thing, instead of using lauric acid, it may be wholly or partially replaced with another fatty acid containing from 8 to 18 carbon atoms. However, fatty acids having from 10 to 14 carbon atoms give better results than those obtained with acids outside this range and lauric acid gives the best results. Obviously, mixtures of the fatty acids may be used instead of a single fatty acid.

While phthalic anhydride is the preferred dibasic acidic constituent, it may be replaced completely or in part by phthalic acid or other equivalents such as maleic and succinic acids or their anhydrides.

Although the percentages of the various constituents are not critical in the sense that a difference of one or two percent of any constituent will make a marked difference in properties of the products, it has been found that the useful ranges are as follows on the basis of the respective glycerides in percent by weight:

(a) The mono-basic acid glycerides (including the stabilized resin acids and abietic acid glycerides) should constitute from 35% to 65% of the total glycerides (b) For each percent of lauric acid glyceride there should be from 1% to 4% of stabilized abietic acid glyceride or its equivalent as stabilized resin acid glycerides (c) When adipic acid is present it should comprise from 5% to 15% of the glycerides to be effective.

The baked films of alkyds containing stabilized abietic acids are not only as good as or better than those containing lauric acid alone, but the alkyds made according to the invention are considerably cheaper. For example, the raw material cost of an alkyd made according to Example 9 above is 30.5 cents per pound whereas the raw materials cost for an alkyd made with 36% lauric acid and 64% phthalic anhydride present as the glycerides is 35.6 cents per pound. The modified alkyd of Example 9 gives baked films of melamine-formaldehyde and urea-formaldehyde which are markedly superior to those made with the straight lauric acid modified alkyd.

Having fully described the invention and set forth preferred embodiments thereof, those skilled in the art will be able to practice the invention either by following the examples given or by making such variations and changes therein as will be obvious without departing from the spirit and scope of the invention.

What is claimed as new is:

1. A non-yellowing baking finish comprising a resin selected from the group consisting of melamine-formaldehyde and urea-formaldehyde resins plasticized with the modified baking alkyd resin formed by reacting together glycerin and a mixture of acids containing (A) at least one of the group consisting of phthalic acid, maleic acid, succinic acid and anhydrides of the foregoing acids; (B) at least one saturated fatty acid having from 8 to 18 carbon atoms; and (C) disproportioned rosin, the glycerides of the fatty acid and disproportioned rosin together comprising from about 35% to about 65% of the total glycerides, and there being from about 1 to about 4 parts of glyceride of disproportionated rosin for each part of said fatty acid glyceride.

2. A non-yellowing baking finish comprising a resin selected from the group consisting of melamine-formaldehyde and urea-formaldehyde resins plasticized with the modified baking alkyd resin formed by reacting together glycerin and a mixture containing phthalic anhydride, adipic acid, lauric acid, and disproportionated rosin, the resulting glyceride of adipic acid constituting about 10 weight percent of the total, the resulting glyceride of lauric acid constituting about 20 weight percent of the total, the resulting glyceride of the disproportionated rosin constituting about 30 weight percent of the total, and the resulting glyceride of the phthalic anhydride constituting the balance of the total.

References Cited in the file of this patent

UNITED STATES PATENTS

| | | |
|---|---|---|
| 1,900,638 | Ellis | Mar. 7, 1933 |
| 1,925,903 | Hovey | Sept. 5, 1933 |
| 1,955,355 | Alvarado et al. | Apr. 17, 1934 |
| 2,074,814 | Smith | Mar. 23, 1937 |
| 2,376,823 | Scrutchfield | May 22, 1945 |
| 2,541,139 | West | Feb. 13, 1951 |

FOREIGN PATENTS

| | | |
|---|---|---|
| 289,794 | Great Britain | Aug. 30, 1929 |
| 599,546 | Great Britain | Mar. 16, 1948 |

OTHER REFERENCES

Paint, Oil and Chemical Review, June 8, 1939, pages 26, 28 and 30.

Hercules Products, copyright 1948, in the section on the Rosin Family (page 6).